United States Patent [19]
Iida et al.

[11] Patent Number: 6,041,029
[45] Date of Patent: Mar. 21, 2000

[54] DISC APPARATUS

[75] Inventors: Michihiko Iida; Tetsuji Kawashima; Shoji Sato, all of Kanagawa; Shozo Masuda, Tokyo, all of Japan

[73] Assignee: Sony Corporation, Tokyo, Japan

[21] Appl. No.: 09/032,500

[22] Filed: Feb. 26, 1998

[30] Foreign Application Priority Data

Feb. 28, 1997 [JP] Japan ................................ P09-046671

[51] Int. Cl.[7] ....................................................... G11B 7/00
[52] U.S. Cl. ................................. 369/50; 369/59; 369/48
[58] Field of Search ................................ 369/47, 48, 49, 369/50, 54, 58, 59, 32; 360/48, 51, 53

[56] References Cited

U.S. PATENT DOCUMENTS 5,848,040 12/1998 Tanaka ........................................ 369/59
5,901,128 5/1999 Hayashi et al. ............................ 369/59

Primary Examiner—Muhammad Edun
Attorney, Agent, or Firm—Limbach & Limbach L.L.P.

[57] ABSTRACT

A disc apparatus in which recorded data can be correctly reproduced despite occurrence of a low-reliability area at a specified position on a disc on which synchronization signals are recorded. A comparison error signal between the playback RF signals read out from a disc 100 and channel clocks PLCK enters a VCO 15 via a phase/frequency comparator 12. A VCO 15 generates PLCK at a frequency corresponding to the voltage of the comparison error signal. A data detection unit 16 takes out data from the playback RF signals. If a Sync pattern detection interpolation unit 17 detects the Sync pattern correctly from this data, the above comparison error signal is directly fed to the VCO 15 and, if otherwise, the sample-and-hold unit 14 holds the voltage of the comparison error signal by control signals from a controller 20. At this time, interpolation of the Sync patterns by the Sync pattern detection interpolation unit 17 is discontinued.

10 Claims, 8 Drawing Sheets

DISC APPARATUS

BACKGROUND OF THE INVENTION

1. Field of the invention

This invention relates to a disc apparatus used for reproducing data recorded on a disc-shaped recording medium.

2. Description of Related Art

In a disc apparatus used as a peripheral equipment of a computer or as a disc apparatus for recording/reproducing picture data, a phase-change optical disc or a magneto-optical disc (rewritable disc) i s used, which i s a disc-shaped recording medium capable of recording a large capacity data to high density and of repeatedly rewriting the data. The phase-change optical disc is such a disc in which data is recorded by phase transition of the recording film between the crystal state and the amorphous state by laser heating and in which the recorded data is read out by exploiting the fact that light reflectivity of the recording film differs depending on these states. On the other hand, a magneto-optical disc is such a disc in which coercivity of a recording film is transiently lowered by laser heating for magnetically recording data and in which the recorded data is read out by exploiting the fact that the angle of polarization of the reflected light differs depending on the magnetized state of the recording film.

With the above-described disc-shaped recording medium, referred to hereinafter as disc, the data writing beginning position and the data writing terminating position are determined by the recording format. Thus, the data rewriting accompanied by laser heating occurs repeatedly at a specified position of the disc where damage to the recording film is liable to be caused. This damage is caused by thermal fluidization of the recording film due to elevated temperature brought about by laser heating. This phenomenon, termed material flow, presents a problem in particular with the phase-change optical disc.

In the above area subjected to the phenomenon of material flow, data errors are liable to be produced during recording/reproduction, thus lowering reliability. If damage to the recording film proceeds further, data recording/reproduction becomes infeasible. In particular, since the data writing beginning position is an area where the sync pattern as the synchronization signal is written, the phase locked loop is disturbed to render it impossible to keep synchronization or the synchronization pattern. Moreover, the Sync pattern is detected by mistake to render re-synchronization time-consuming.

SUMMARY OF THE INVENTION

It is therefore an object of the present invention to provide a disc apparatus in which synchronization can be maintained even if low data reliability area is produced at a specified position on the disc to render it possible to reproduce data recorded on the disc correctly.

The present invention provides a disc apparatus for reproducing signals recorded on a rewritable disc-shaped recording medium including signal read-out means for reading out signals recorded on the disc-shaped recording medium, clock signal generating means for generating clock signals based on a comparison error signal between the read-out signal and the generated clock signals, synchronization signal detection means for detecting synchronization signals from the read-out signal, control means for predicting the timing a signal read-out position of the signal read-out means reaches a low-reliability area at a specified position of the disc-shaped recording medium based on a recording format and for generating control signals directly before the predicted timing, and clock signal holding means for holding the comparison error signal entering the clock signal generating means based on the control signals.

With the above disc apparatus, synchronization can be kept even in cases wherein damage to a recording film occurs in specified area in which synchronization signals are recorded on the disc, thus enabling correct reproduction of the data recorded on the data.

That is, with the present disc apparatus, synchronization can be kept even in cases wherein a low data reliability area is produced at a specified position where synchronization signals are recorded on the disc thus enabling correct reproduction of the data recorded on the disc.

DESCRIPTION OF PREFERRED EMBODIMENTS

Figure 1:
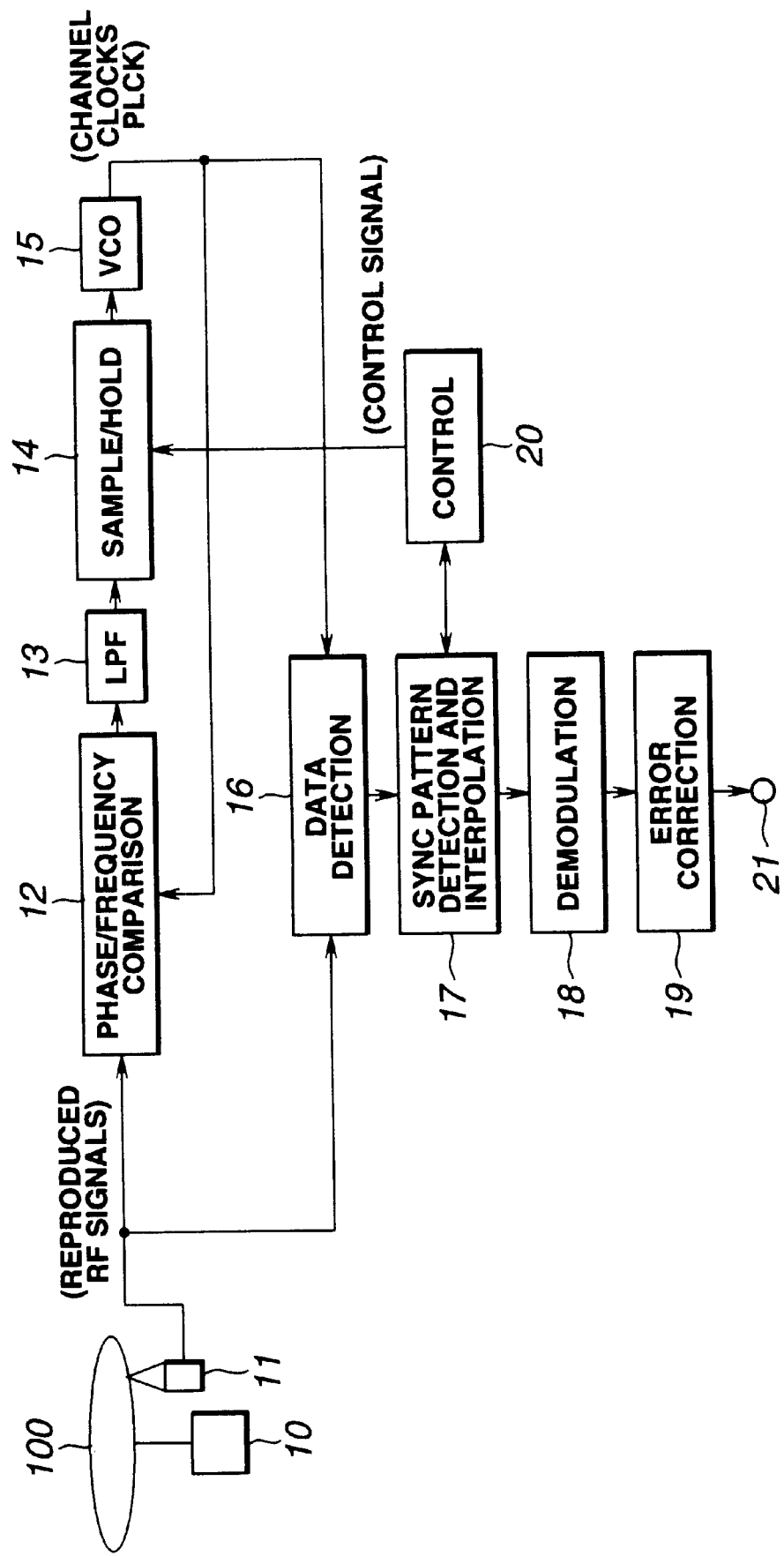
FIG. 1 is a block diagram showing an illustrative structure of a disc apparatus according to the present invention.

Referring to the drawings, preferred embodiments of a disc approximately of the present invention will be explained in detail. In the following description of a reproducing system for reading out data recorded on a disc, it is assumed that the disc is a phase-change optical disc.

FIG. 1 shows a block diagram showing an illustrative structure of a disc apparatus according to the present invention. This disc apparatus is configured for reading out and demodulating data recorded on a disc 100 for outputting demodulated data as playback signals, and is made up of a portion for generating clocks based on playback RF signals read out from the disc 100 and another portion for taking out data from the reproduced RF signals based on the above-mentioned clock signals.

The disc 100, carrying the recorded data, is run in rotation by a spindle motor 10 at a pre-set RPM.

The data recorded on the disc 100 is read out by a signal readout unit 11, as signal readout means including a pickup and a servo system, and is converted into bi-level playback RF signals, which are sent to a data detection unit 16 and to a phase/frequency comparator 12.

The phase/frequency comparator 12 is used for comparing the phase and the frequency of the playback RF signals from the signal readout unit 11 to clock signals (channel clocks PLCK) from a VCO 15 as later explained. The results of comparison, that is comparison error signals, are sent via a low-pass filter (LPF) 13 and a sample-and-hold unit 14 to the VCO 15 as a control voltage.

The low-pass filter (LPF) is used for passing only low frequency components of the comparison error signals sent from the phase/frequency comparator 11 to the sample-and-hold unit 14. Specifically, this LPF 13 is a loop filter.

The sample-and-hold unit 14 is used for holding the comparison error signals entering the VCO 15 via LPF 13 based on a control signal from a controller 20. An output of the sample-and-hold unit 14 is supplied as a control voltage to the VCO 15. The specified structure of this sample-and-hold unit 14 will be explained subsequently.

The VCO 15 is clock signal generating means for bit synchronization of the playback RF signals read out from the disc 100 to generate clock signals. Specifically, the VCO 15 is a voltage-controlled oscillator (VCO) for generating the channel clocks PLCK at an oscillation frequency corresponding to the voltage of the comparison error signals entered as a control voltage via sample-and-hold unit 14.

The channel clocks PLCK, outputted by the VCO 15, are returned to the phase/frequency comparator 12 to complete a feedback loop constituting a PLL circuit. That is, the phase/frequency comparator 12, LPF 13, sample-and-hold unit 14 and the VCO 15 make up a section for generating the channel clocks PLCK based on the playback RF signals read out from the disc 100. The channel clocks PLCK are also sent to a data detection unit 16 as later explained.

The data detection unit 16 is used for taking out data from the playback RF signals read out from the disc 100. The data taken out is converted to bi-level signals in synchronism with the channel clocks PLCK as later explained.

A Sync pattern detection interpolation unit 17 is synchronization signal detection interpolation means having the function of detecting the Sync pattern, that is synchronization signals arrayed at the leading end of data taken out from the playback RF signals at the data detection unit 16, and the function of interpolating the Sync pattern at a timing at which the Sync pattern should have been detected in the absence of the detected Sync pattern. Meanwhile, the operation of detection and interpolation of the Sync pattern is discontinued by control signals from a controller 20 which will be explained subsequently.

A demodulation unit 18 demodulates data detected by the data detection unit 16 based on the Sync pattern from the Sync pattern detection interpolation unit 17. The method for demodulation used may, for example, be a counterpart operation of 8-to-16 modulation of converting 8-bit data into 16-bit data.

The 8-to-16 modulation is a modulation method of converting 1 byte (8 bits) of original data into pre-set 16-channel bits. Each channel bit has a width equal to one-half the width of the original 1 bit. The main purpose of this 8-to-16 modulation is to reduce the amount of high frequency components in the original data string. In the 8-to-16 modulation, the original data bit string is converted into a channel bit string having a minimum pulse width (3 channel bit width) broader than the minimum pulse width (2 channel bit width) of the original data bit string so that the number of consecutive '1's or '0's will be not less than 3 and not more than 11.

An error correction unit 19 corrects the demodulated data for errors using an error correction code. The data corrected for errors is outputted as playback signals at an output terminal 21. The error correction code (ECC) will be explained subsequently.

The data detection unit 16, Sync pattern detection interpolation unit 17, demodulating unit 18 and the error correction unit 19 represent a portion for taking out and demodulating data based on the channel clocks PLCK from the playback RF signals read out from the disc 100.

The controller 20 is control means for generating control signals for causing the sample-and-hold unit 14 to hold the control voltage entered to the VCO 15 and control signals for causing the Sync pattern detection interpolation unit 17 to discontinue the Sync pattern interpolation. The timing for generating the above-mentioned control signals is found by counting the Sync patterns as synchronization signals from the Sync pattern detection interpolation unit 17 as reference is made to the data array on the disc 100 pre-stored and set in accordance with a pre-determined format. If the detection of the Sync pattern is discontinued by the above control signals, the timing for re-initiating the detection of the Sync pattern and the timing for cancelling the holding state of the sample-and-hold unit 14 are found by counting the channel clocks PLCK which are the sample-held clock signals from the VCO 15.

The operation of the above-described disc apparatus of the present invention, shown in FIG. 1, for reading out and reproducing data recorded on the disc 100 having a low-reliability area at a specified position, is now explained with reference to FIGS. 1 and 2.

Figure 2:
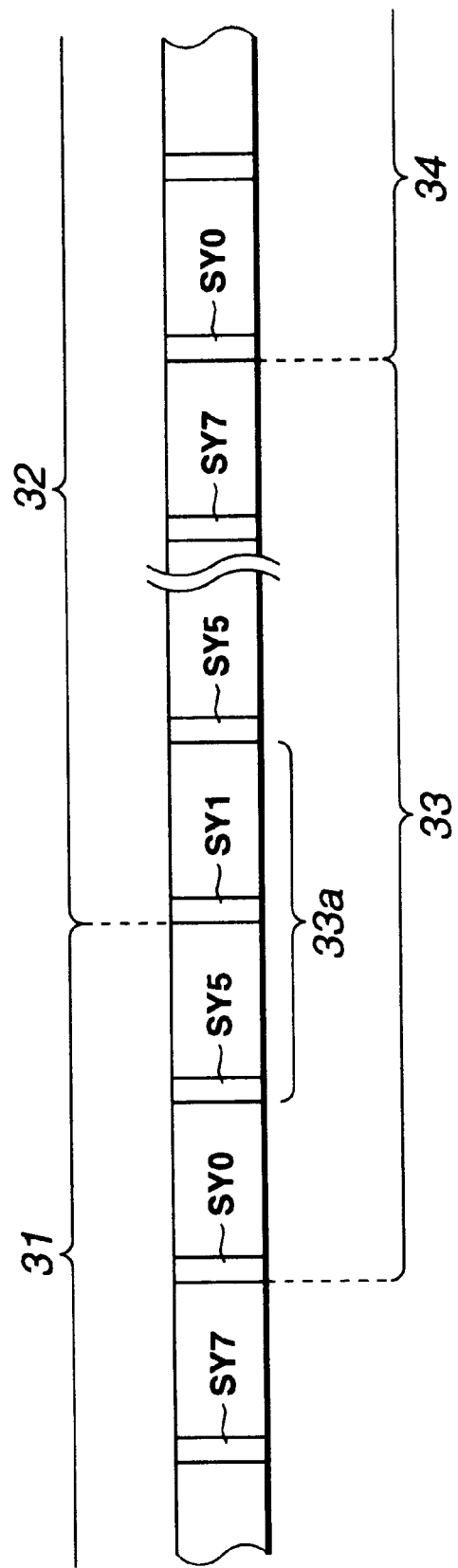
FIG.2 illustrates the state of a data frame in an area where a damage to the disc recording film has occurred.

FIG. 2 shows the state of the data frame in the low-reliability area. This low-reliability area is such an area including the junction between the beginning and terminal portions of data recorded in terms of a frame as a pre-set recording unit, or such an area in which the above-mentioned material flow phenomenon is manifested. In this low-reliability area, the probability is high that errors are produced during data recording/reproduction. There are occasions wherein the Sync patterns as synchronization signals are detected by error.

An area 31 is such an area where data is pre-recorded, whilst an area 32 is an area where data has been recorded newly. An area 33 is such an area in which data already recorded in the area 31 is connected to data newly recorded in the area 32, and is termed a linking area. It is assumed that the linking area 33 is made up of 5 frames, and that damage due to material flow has occurred in the recording film of an area 33a corresponding to two of these five frames.

At the leading end of each frame of data recorded in the areas 31, 32 is provided a Sync pattern (frame sync) which is the synchronization signal for finding the demarcation of data symbols. In each frame of data recorded in the area 31, the Sync pattern Syn (n=0 to 7) is recorded in the sequence explained later with reference to FIG.9. The Sync pattern of each frame of data newly recorded in the area 32 is SY1, SY5, SY7, SY0 and so forth. It is data of the area 34 beginning from a data frame headed by the Sync pattern SY0 that is transferred to and used in, for example, a computer.

The above Sync pattern is a unique pattern usually not appearing in data. For example, it is a '11T11T pattern' which is the maximum 11-bit length pattern used in a compact disc (CD) or a '14T14T pattern' which is the maximum 14-bit length pattern used in a digital video disc (DVD).

On detection of the Sync pattern, the Sync pattern detection interpolation unit 17 opens a detection window at the position (timing) where the Sync pattern is expected to be detected next to effect Sync pattern detection only in this detection window. Since the Sync pattern detection interpolation unit 17 has the function of interpolating the Sync patterns if the Sync pattern cannot be detected in the detection window, synchronization can be maintained even if, for some reason, the Sync pattern ceases to be detected transiently.

However, if there is the low-reliability area in the recording film on the disc 100, there may be occasions wherein the Sync pattern detection interpolation unit 17 detects the Sync pattern by error. If this mistaken detection occurs, the timing for the Sync pattern detection interpolation unit 17 to open the detection window to start PLL pull-in is delayed, so that the timing of detecting the correct Sync pattern is also delayed. Thus, there may be occasions wherein decoding of necessary data cannot be started until the readout position on the disc 100 being read out by the signal readout unit 11 reaches the leading end of data which should be read out.

For evading this inconvenience, in the disc apparatus of the present invention, the controller 20 performs control for anticipating the timing the readout position on the disc 10 reaches the above-mentioned low-reliability area to discontinue the operation of the Sync pattern detection interpolation unit 17. This anticipation is carried out on the basis of the recording format of the disc 100. This is due to the fact that the data write start position and data write end position on the disc which is the are determined by the recording format. This recording format is formulated in consideration of the length of the above-mentioned low-reliability area termed material flow. Thus, the controller 20 counts the channel clocks PLCK and opens the detection window when the count value indicates that the readout position on the disc 100 has traversed the low-reliability area. The PLL re-synchronization is re-initiated on the assumption that the initial state has been re-set.

Figure 3:
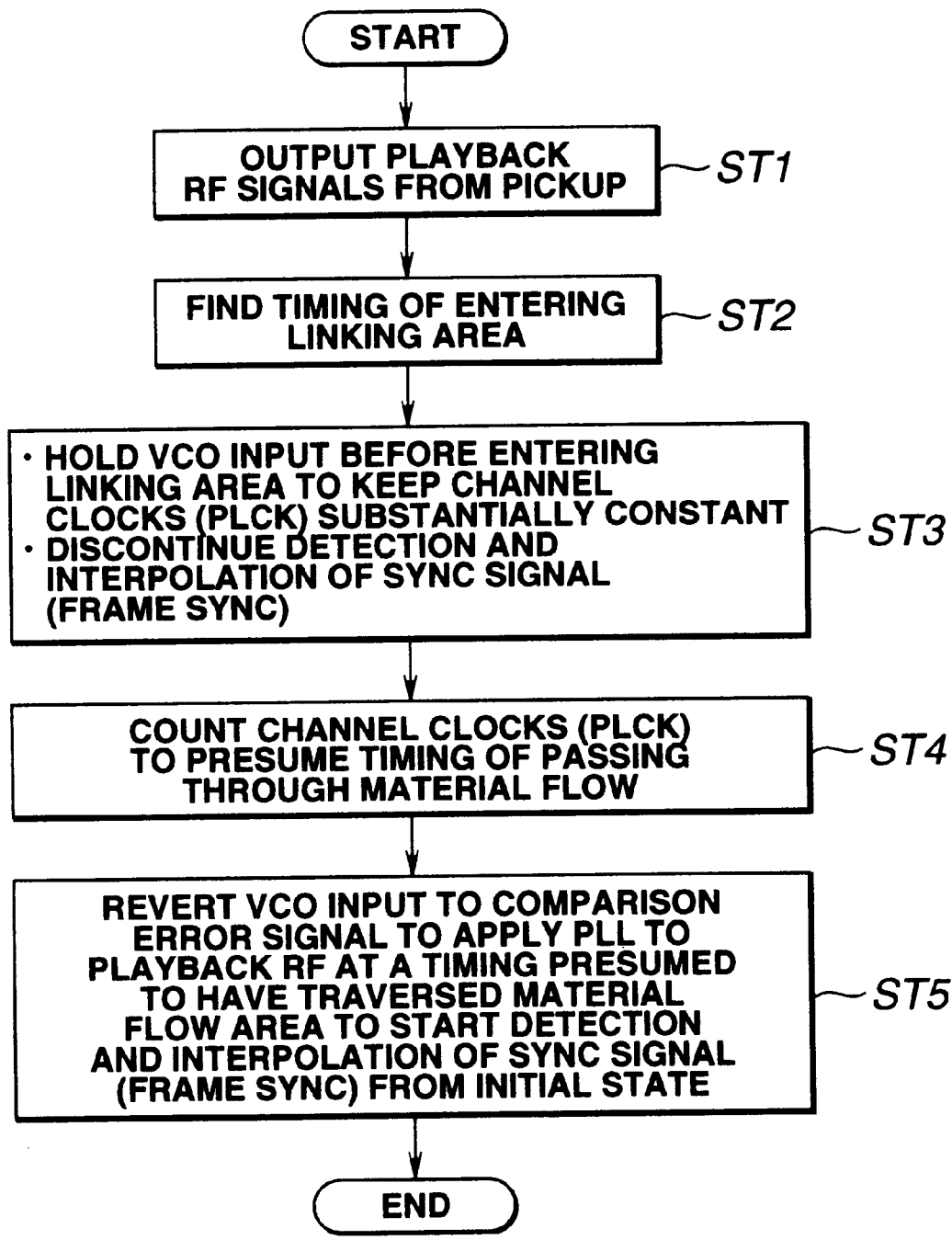
FIG. 3 shows the PLL control sequence in an area including a linking area for data writing.

FIG. 3 shows the flowchart illustrating the sequence of operations in the linking area 33 where data writing linking occurs.

When the disc apparatus starts its reproducing operation, the spindle motor 10 starts driving the disc 100 to perform focussing control of the pickup of the signal readout unit 11.

At step ST1, the pickup of the signal readout unit 11 starts reading out signals recorded on the disc 100 to output playback signals.

Then, at step ST2, the timing when the readout position on the disc 100 enters a linking area 33 including a material flow area 33a is found. This timing is predicted on the basis of the recording format determined in consideration of the length of the linking area 33 or the length of the material flow area 33a as found from the recording format.

In the present embodiment, the controller 20 predicts the passage timing of the linking area based on the sector number included in the demodulated data as later explained and the sequence of occurrence of the Sync pattern (Syn) as detected by the Sync pattern detection interpolation unit 17.

At step ST3, the voltage of the comparison error signal, supplied as a control signal to the VCO 15 via the sample-and-hold unit 14, is sample-held by the control signal from the controller 20 ahead of a timing when the readout position on the disc 100 reaches the linking area 33 as found at step ST2, for holding the frequency of the channel clocks PLCK outputted by the VCO 15 at s substantially constant value. Simultaneously, detection of the Sync pattern (frame sync) at the Sync pattern detection interpolation unit 17 and the interpolation of the undetected Sync patterns are discontinued by the above control signals.

At step ST4, the channel clocks PLCK sample-held at step ST3 are counted for anticipating the timing when the readout position on the disc 100 traverses the material flow area 33a. This timing is anticipated on the basis of the length of the material flow area 33a previously taken into account. In the data frame shown in FIG.2, detection of the Sync pattern is discontinued until counting of the channel clocks PLCK of two frames corresponding to the area 33a.

At step ST5, sample-holding of the sample-and-hold unit 14 is cancelled at the timing when the readout position on the disc 100 is estimated to have traversed the material flow area 33a in order to re-set the input control voltage to the VCO 15 to the comparison error signal from the phase/frequency comparator 12.

This achieves PLL pull-in for the playback RF signals to start detection of frame syncs and interpolation of undetected frame syncs from the initial state.

By repetition of the operations from the step ST1 to the step ST5 in case of necessity, data may be reproduced under maintenance of synchronization even if the area of a specified position carrying the Sync pattern on the disc 10 is damaged.

Figure 4:
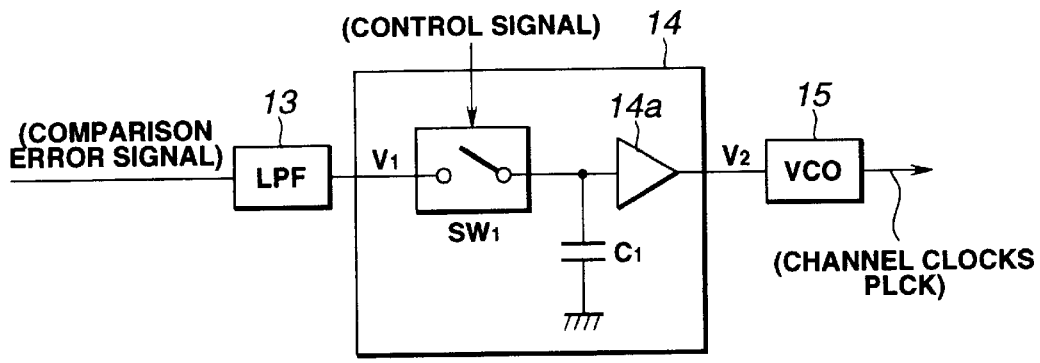
FIG.4 shows an illustrative structure of a sample-and-hold unit.

FIG.4 shows an illustrative structure of the sample-and-hold unit 14.

The comparison error signal from the phase/frequency comparator 12 is entered via LPF 13 to the sample-and-hold unit 14 as control signals, as shown in FIG. 1

When the Sync pattern detection interpolation unit 17 is correctly detecting the Sync pattern from the playback RF signals, the switch SW1 is turned on by the control signals from the controller 20. A voltage V1 of the comparison error signal outputted from the phase/frequency comparator 12 via LPF 13 is amplified by an amplifier 14a, if necessary, into a voltage V2, which is entered as a control voltage to the VCO 15. The VCO 15 oscillates the channel clocks PLCK at a frequency corresponding to the input voltage V2. The capacitor C1 is charged at this time to the signal voltage V1 from the LPF 13.

If the Sync pattern detection interpolation unit 17 is unable to correctly detect the Sync pattern from the playback RF signals in the detection window, the switch SW1 is turned off by the control signal from the controller 20. The input voltage to the VCO 15 is maintained at V1 by the capacitor C1 charged to the voltage V1. The input impedance of the amplifier 14a is sufficiently high. An amplifier similar to the amplifier 14a may be provided between the LPF 13 and the switch SW1, if so desired.

Figure 5:
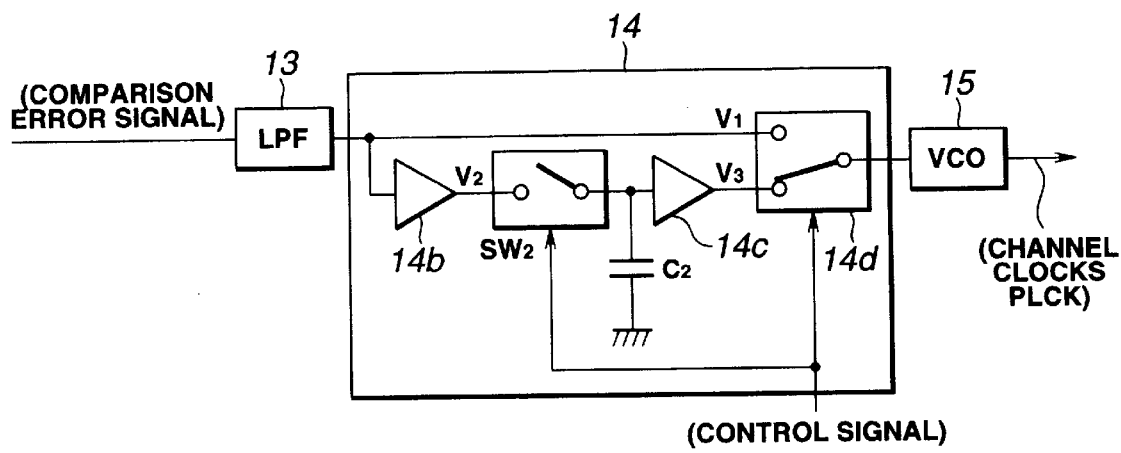
FIG. 5 shows another illustrative structure of a sample-and-hold unit.

FIG.5 shows another illustrative structure of the sample-and-hold unit 14. This illustrative structure, more complex than the structure of FIG.4, is effective in case the structure of FIG.4 poses a problem in connection with delay in operation caused by the time constant by the capacitor C1 and the interconnection resistance.

If the Sync pattern is detected from the playback RF signals, the switch SW2 is turned on by the control signals from the controller 20, while a selector 14d is set to a state in which the signal voltage V1 from the LPF 13 is directly entered to the VCO 15. The VCO 15 oscillates the channel clocks PLCK at a frequency corresponding to the voltage V1 of the comparison error signal from the phase/frequency comparator 12 outputted via LPF 13. The capacitor C2 is charged at this time to a voltage V2 occasionally amplified from the voltage V1 by the amplifier 14b.

If the Sync pattern is not detected from the playback RF signal, the switch SW2 is turned off by the control signals from the controller 20, whilst the selector 14d is set to a state in which the voltage V3 from the amplifier 14c enters the VCO 15. The capacitor C2 is charged up to the output voltage V2 of the amplifier 14b. The output voltage V2 of the amplifier 14b is further amplified by the amplifier 14c to a voltage V3. The amplifier 14c has a sufficiently high input impedance.

With the sample-and-hold unit 14 shown in FIGS. 4 and 5, the input voltage of the VCO 15 can be maintained substantially constant even if the Sync pattern cannot be detected correctly from the playback RF signals. This enables construction of clock signal generating means capable of maintaining the frequency of the channel clocks PLCK substantially constant, without the necessity of providing complex clock generating means employing a quartz oscillator, even if the Sync pattern is not detected correctly.

The structure of the data sector ECC block, recording sector and the sync frames, read out from the disc 100 by the disc apparatus having the above-described structure and operational sequence, is explained. In the following description, the disc is a rewritable phase-change optical disc having a diameter of 120 cm and a recording capacity per recording surface of 2.6 Gbytes.

Figure 6:
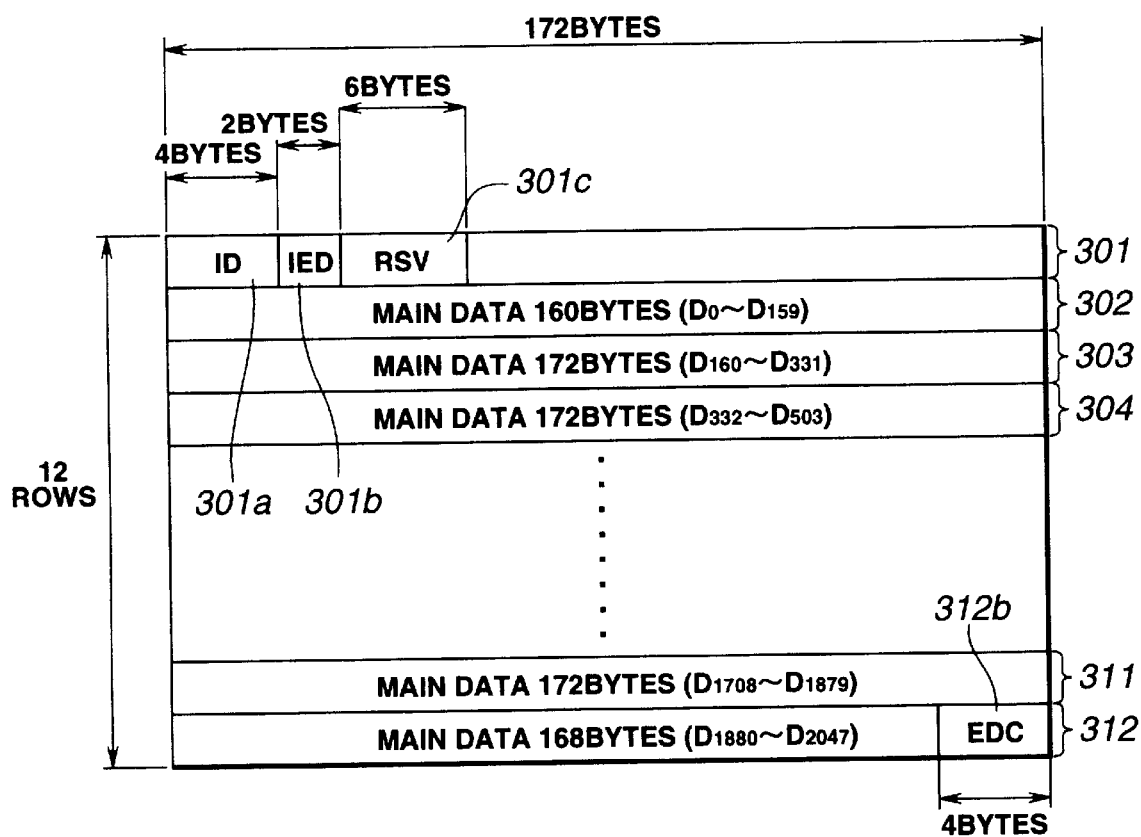
FIG. 6 shows the structure of a data sector.

FIG. 6 shows the sector structure of data recorded on the disc 100. This data sector is a basic sector made up of main data of 2048 bytes and data specifying sector numbers, and has an arraying structure of 172 bytes×12 rows.

In a leading 4-byte ID portion 301a of the first row of data 301, there is contained the information including not only the sector number (sector address) but also the layers or areas to which belongs the sector.

A 2-byte IED area 301b, next following the ID portion 301a, is an error detection parity of the ID portion 301a.

In a 6-byte RSV portion 301c next following the IED portion 301b is arrayed system appointment data.

A 4-byte EDC portion 312b, appended next to the 12th row 312 at the trailing end of the data sector, is used for detecting errors of data sector subsequent to error detection. This EDC portion is the error detection parity for the entire sector.

Figure 7:
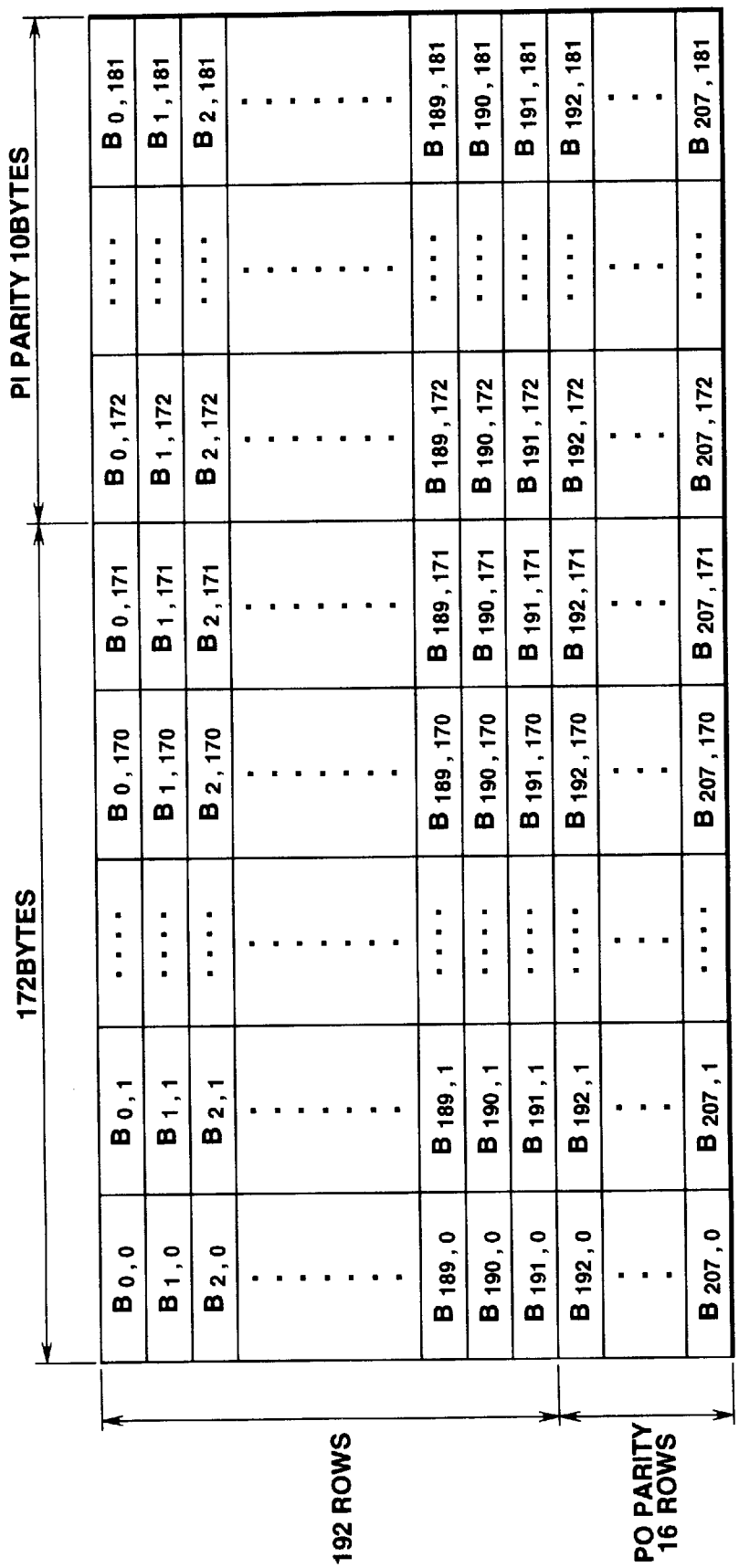
FIG. 7 shows the structure of an ECC block .

FIG.7 shows the structure of an error correction code (ECC) block used for scrambling main data of the 2048-byte data sector for constructing an error-correction-coded recording sector. The error correction coding is by blocking scrambled data sectors every 16 sectors. That is, 16 rows of PO parity and 10 columns of PI parity are generated and appended to contiguous 16 data sectors each having an array structure of 172 bytes×192 rows to form 182 bytes×208 columns of the Reed Solomon (RS) product code. In this product code, each of 182 columns is an RS(208, 192, 17) code and each of 208 rows is a RS( 182, 1 72, 1 1) code.

Before modulating the ECC block shown in FIG.7 in the row direction and recording the modulated data, the rows of the ECC block are interchanged.

Figure 8:
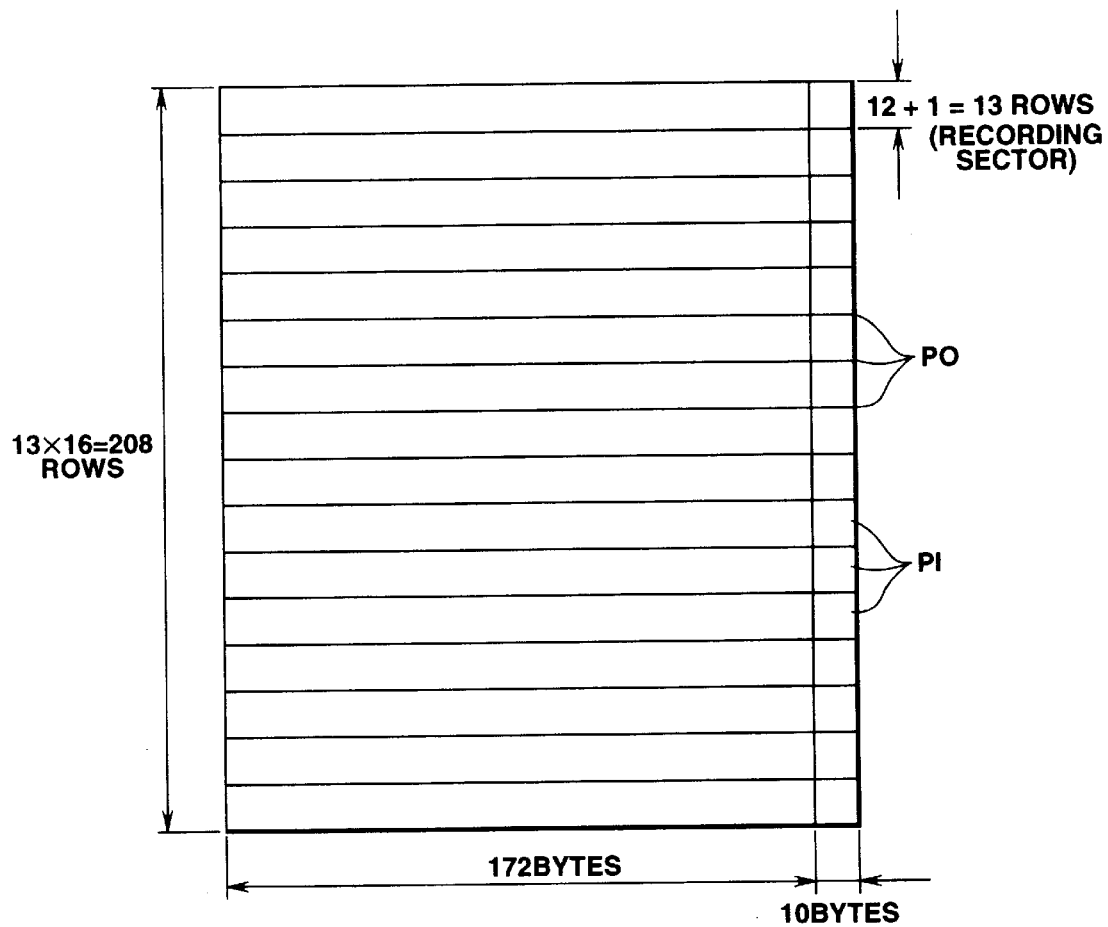
FIG. 8 shows the structure of a recording sector.

FIG.8 shows the state of the recording sector in which the rows have been interchanged as described above. That is, the 16 rows of the PO parity are moved to the last row of each sector row-by-row to construct each sector into a recording sector made up of 182 bytes×13 rows.

Next, a physical sector obtained on converting the recording sector shown in FIG.8 into a frame structure and modulating the resulting frame structure is explained.

Figure 9:
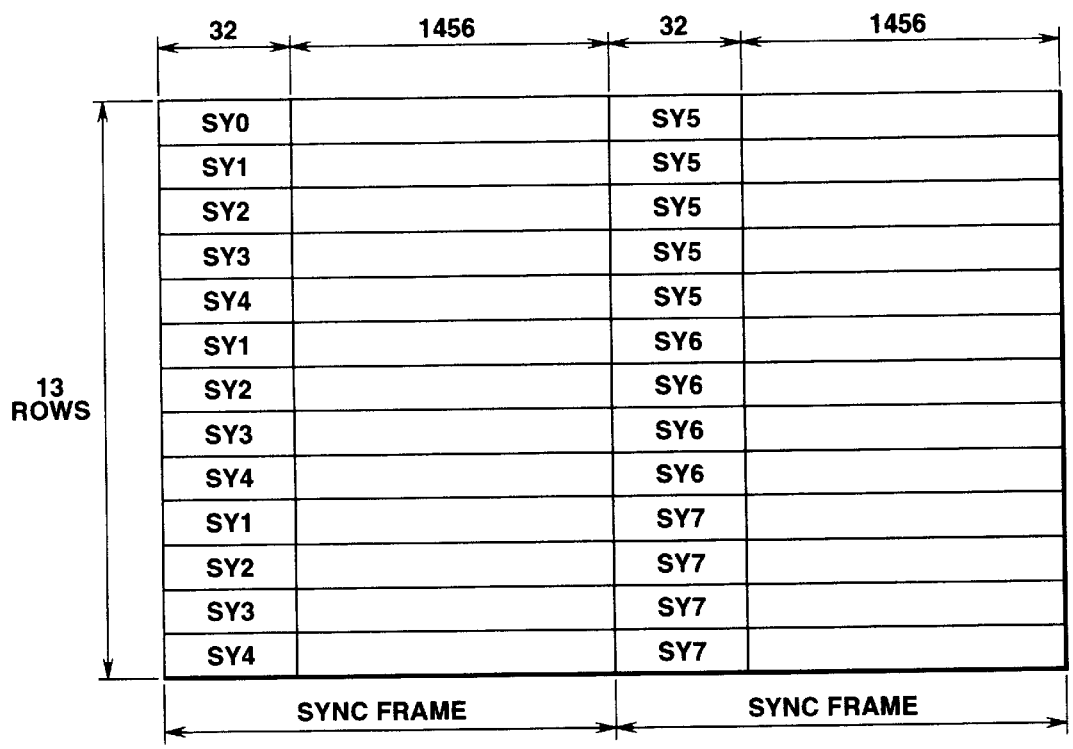
FIG. 9 shows the structure of a physical sector.

FIG.9 shows the structure of the physical sector having the above-described frame structure. This physical structure is made up of 26 sync frames each made up of Sync codes SY0 to SY7 each of a 32 channel bit length and a data portion of 1456 channel bit length. Specifically, a Sync code is appended to the leading end of a recording sector made up of 182 bytes×13 rows, at an interval of 92 bytes, to constitute 26 sync frames, which are modulated by 8-to-16 modulation and recorded as the physical sector on the disc 100. These Sync codes SY0 to SY7 correspond to the Sync patterns SY0 to SY7 shown in FIG.2.

The first function of the above-mentioned Sync code is to indicate the demarcation of 16 channel bits for data demodulation. To this end, 14 channel bit width pulses, sufficiently longer than the maximum pulse width of 11 channel bits appearing at the modulated data portion, are embedded to enable reliable detection of the Sync codes.

The second function of the Sync codes is to indicate the frame position in the sector to enable demodulated data to be held at the correct positions of the ECC array in case the Sync codes are detected after occurrence of burst errors. The Sync codes SY0 to SY7, used for this purpose, are designed so that distinguishment can be made at the leading end 10 channel bits. For the Sync code, it is necessary that the 8–16 modulation rule (the number of consecutive '1's or '0's being not less than 3 and not larger than 11) is met at the junction portion to the trailing end of the previous sync frame, and that the Sync code has the function of controlling the dc components of the 8–16 modulation channel bit string of the data portion. To this end, each of the eight Sync patterns SY0 to ST7 has four functions, such that, in actuality, there exist 8×4=32 patterns. The controller 20 shown in FIG. 1 recognizes the sequence of occurrence of eight Sync patterns to predict the position of three linking area 33.

What is claimed is:

1. A disc apparatus for reproducing signals recorded on a rewritable disc-shaped recording medium, comprising:

signal read-out means for reading out signals recorded on the disc-shaped recording medium;

clock signal generating means for generating clock signals based on a comparison error signal between the read-out signal and the generated clock signals;

synchronization signal detection means for detecting synchronization signals from the read-out signal;

control means for predicting the timing a signal read-out position of the signal read-out means reaches a low-reliability area at a specified position of the disc-shaped recording medium based on a recording format and for generating control signals directly before the predicted timing; and clock signal holding means for holding the comparison error signal entering said clock signal generating means based on said control signals.

2. The disc apparatus as claimed in claim 1 wherein said low-reliability area of the disc-shaped recording medium is an area which includes a junction portion between a beginning portion and an end portion of data recorded in terms of a pre-set unit and in which the synchronization signals have been recorded.

3. The disc apparatus as claimed in claim 1 wherein said synchronization signal detection means interpolate synchronization signals if no synchronization signals are detected, said synchronization signal detection means discontinuing interpolation of said synchronization signals based on said control signals.

4. The disc apparatus as claimed in claim 1 wherein said control means counts the held clock signals to predict passage of said signal readout position through the low reliability area of said specified position.

5. The disc apparatus as claimed in claim 1 wherein said disc-shaped recording medium is a phase-change optical disc.

6. The disc apparatus as claimed in claim 1 further comprising:

demodulating means for demodulating a signal from said signal read-out means based on said synchronization signals.

7. The disc apparatus as claimed in claim 1 wherein plural sorts of synchronization signals are recorded on said disc-shaped recording medium in a pre-set sequence from one data frame to another;

said control means predicting the timing the signal readout means reaches said low-reliability area based on a recording sequence of said synchronization signals.

8. A circuit for generating synchronization signals for detecting data from RF signals reproduced by signal readout means from a rewritable disc-shaped recording medium, comprising:

clock signal generating means for generating clock signals in bit synchronization with reproduced RF signals;

comparator means for comparing the generated clock signals and playback RF signals as to phase and frequency for outputting a comparison error signal for routing this comparison error signal as a control voltage to said clock signal generating means;

means for holding said comparison error signal entering said clock signal generating means, and means for predicting the timing the signal readout means reaches a low-reliability area at a specified position on the disc-shaped recording medium based on the recording format of data recorded on the disc-shaped recording medium, said means controlling said holding means before the signal readout means reaches said low-reliability area for controlling the frequency of the clock signals outputted by said clock generating means so as to be substantially constant.

9. The circuit as claimed in claim 8 further comprising:

data detection means for taking out data from said RF signals based on said clock signals; and synchronization signal detection means for detecting synchronization signals for demodulation from the detected data and for interpolating the detected synchronization signals;

said control means controlling said synchronization signal detection means for discontinuing the detection and interpolation of the synchronization signals during the time said signal readout means is traversing said low-reliability area.

10. The circuit as claimed in claim 8 wherein plural sorts of synchronization signals are recorded on said disc-shaped recording medium in a pre-set sequence from one data frame to another;

said control means predicting the timing the signal readout means reaches said low-reliability area based on a recording sequence of said synchronization signals.

* * * * *